United States Patent
Preteseille

(10) Patent No.: US 9,531,414 B2
(45) Date of Patent: Dec. 27, 2016

(54) MANAGEMENT PROCESS OF A RADIO SERVICE FOLLOWING IN A RECEPTOR AND CORRESPONDING RECEPTOR

(71) Applicant: STMicroelectronics (Grand Ouest) SAS, Delarue (FR)

(72) Inventor: Erwan Preteseille, Arnage (FR)

(73) Assignee: STMicroelectronics (Grand Ouest) SAS, Delarue (FR)

( * ) Notice: Subject to any disclaimer, the term of this patent is extended or adjusted under 35 U.S.C. 154(b) by 0 days.

(21) Appl. No.: 14/918,880

(22) Filed: Oct. 21, 2015

(65) Prior Publication Data
US 2016/0294421 A1 Oct. 6, 2016

(30) Foreign Application Priority Data
Mar. 30, 2015 (FR) ...................................... 15 52678

(51) Int. Cl.
*H04B 1/06* (2006.01)
*H04B 1/18* (2006.01)

(52) U.S. Cl.
CPC . *H04B 1/06* (2013.01); *H04B 1/18* (2013.01)

(58) Field of Classification Search
None
See application file for complete search history.

(56) References Cited

U.S. PATENT DOCUMENTS

| 2011/0140848 A1* | 6/2011 | Abukawa | H04H 20/26 340/8.1 |
| 2011/0306313 A1 | 12/2011 | Jaisimha et al. | |
| 2014/0372132 A1* | 12/2014 | Tardio | G07C 11/00 705/2 |

FOREIGN PATENT DOCUMENTS

| DE | 102005041653 A1 | 3/2007 |
| EP | 2713534 A1 | 4/2014 |

OTHER PUBLICATIONS

Chandrasekhar, V., et al., "Survey and Evaluation of Audio Fingerprinting Schemes for Mobile Query-By-Example Applications," Proceedings of the 12th International Society for Music Information Retrieval Conference (ISMIR 2011), Oct. 24-28, 2011, 6 pages.
Dixon, S., et al., "MATCH: A Music Alignment Tool Chest," Proceedings of the 6th International Conference on Music Information Retrieval (ISMIR 2005), Sep. 11-15, 2005, 6 pages.
Wang, A.L., "An industrial-strength audio search algorithm," Proceedings of the 4th International Conference on Music Information Retrieval (ISMIR 2003), Oct. 27-30, 2003, 7 pages.

* cited by examiner

*Primary Examiner* — Creighton Smith
(74) *Attorney, Agent, or Firm* — Slater Matsil, LLP

(57) ABSTRACT

Method for managing, in a receiver, a radio service continuity based on synchronized broadcasts of identical audio contents on different frequencies, comprising, the receiver being tuned to a first frequency corresponding to a first broadcast of a first audio content, a detection in the receiver of a second audio content broadcast on a second frequency, having a level of quality above a threshold and paired with the first audio content.

25 Claims, 1 Drawing Sheet

MANAGEMENT PROCESS OF A RADIO SERVICE FOLLOWING IN A RECEPTOR AND CORRESPONDING RECEPTOR

This application claims priority to French Patent Application No. 1552678, which was filed Mar. 30, 2015, which application is hereby incorporated herein by reference.

TECHNICAL FIELD

Implementations and embodiments of the invention relate to radio receivers, and more particularly, radio receivers designed to implement radio service continuity based on synchronized broadcasts of identical audio contents on different frequencies.

BACKGROUND

Currently, radio receivers provide FM radio service continuity by virtue of the features of a radio data system, known by those skilled in the art by the acronym RDS, in which unique program identification (PI) codes are assigned to each radio station.

With these PI codes decoded, the radio receivers are capable of identifying whether an alternative frequency carries the same radio station as that currently being listened to and possibly performing a switchover to the alternative frequency in order to allow a station to be listened to without interruption when travelling.

However, the RDS service is not always available in all countries. For example, this RDS service is not deployed in China.

Moreover, some radio stations do not always provide the RDS service.

Also, since the sensitivity necessary to be able to decode the RDS information is not as good as that of the FM audio signals, a better reception quality is necessary to decode the PI codes.

SUMMARY

According to one implementation and embodiment, a receiver and a management method are proposed that will allow for a radio service continuity in the case where the RDS service is not available in the country concerned and/or on certain radio stations.

According to another implementation and embodiment, a receiver and a management method are proposed that can effectively enhance the performance of the receiver on the radio service continuity when RDS signal reception quality is weak.

According to an aspect, there is proposed a method for managing, in a receiver, a radio service continuity based on synchronized broadcasts of identical audio contents on different frequencies, comprising, the receiver being tuned to a first frequency corresponding to a first broadcast of a first audio content, a detection in the receiver of a second audio content broadcast on a second frequency, having a level of quality above a threshold and paired with the first audio content.

Thus, a failing RDS system is replaced by an audio comparison of radio broadcast audio contents, and, in case of audio pairing, it is possible to decide or not to switch over to an alternative frequency.

In effect, even if the level of quality of the second audio content is above the threshold, it is possible to decide, for example in the case where the level of quality of the second audio content is lower than that of the first audio content, that the latter, broadcast on the first frequency, will be maintained so as not to degrade the level of quality.

Advantageously, the management method can further comprise a switchover of the receiver to the second frequency based on selection criteria, so as to broadcast the second audio content and thus ensure the radio service continuity. The selection criteria can comprise the level of quality of the second audio content broadcast on the second frequency, or else other criteria.

The frequencies can be FM (frequency modulation) frequencies which offer synchronized broadcasts of identical audio contents on different frequencies.

That being the case, some audio contents may be broadcast in a digital audio radio broadcast system such as DAB (Digital Audio Broadcasting), DRM (Digital Radio Mondiale), or HD Radio, offering an enhanced broadcast quality.

If a first audio content is in FM and a second audio content in DAB is found with a good level of quality above the threshold, the frequency switchover will for example be performed to the second audio content in DAB which is a preferred broadcast compared to an analog FM broadcast.

The detection in the receiver comprises, for example, a scan of frequencies. A current frequency of a current audio content having the level of quality above the threshold is detected. It then detected whether or not there is a pairing of the current audio content with the first audio content. The second frequency then becomes the current frequency if a pairing is detected, and, if a pairing is not detected, the scan and detection are repeated.

For audio streams broadcast in FM, it is advantageously possible to perform the detection or not of the pairing between two audio contents which are de facto temporally aligned.

When one of the two audio contents is broadcast in FM and the other audio content is broadcast in DAB, a temporal alignment of the two audio contents taking into account the time offset between the analog broadcast and the digital broadcast is performed prior to the possible detection of the pairing.

According to one implementation, the broadcast frequencies comprise frequencies chosen from the group formed by the FM, DAB, DRM and HD Radio frequencies.

According to another aspect, a receiver is proposed that is suitable for implementing a radio service continuity based on synchronized broadcasts of identical audio contents on different frequencies, characterized in that it comprises an input circuit for receiving at least one first audio content broadcast on a first frequency and at least one additional audio content broadcast on another frequency, and a processor configured to detect, from the at least one additional audio content, a second audio content broadcast on a second frequency, having a level of quality above a threshold and paired with the first audio content.

According to one embodiment, the processor is further configured to switch over the receiver to the second frequency based on selection criteria, so as to broadcast the second audio content and thus ensure the radio service continuity.

According to another embodiment, the input circuit is configured to perform a frequency scan, the processor comprises a first detector suitable for performing a first detection on a current frequency of a current audio content having the level of quality above the threshold, a second detector suitable for performing a second detection or not of the pairing of the current audio content with the first audio content and a controller suitable for activating the input circuit so as to continue the scan and the first and second detectors, if a pairing is not detected.

BRIEF DESCRIPTION OF THE DRAWINGS

Other advantages and features of the invention will become apparent on studying the detailed description of non-limiting implementations and embodiments, and attached drawings in which.

DETAILED DESCRIPTION OF ILLUSTRATIVE EMBODIMENTS

Figure 1:
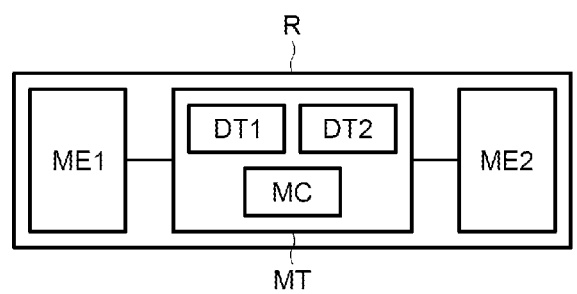
FIG. 1 schematically illustrates an embodiment of a receiver suitable for implementing a radio service continuity according to the invention.

FIG. 1 presents a block diagram of a receiver R configured to implement a radio service continuity according to the invention.

The receiver R comprises input circuits ME1 and ME2 to receive, respectively, at least one first audio content broadcast on a first frequency and at least one additional audio content broadcast on another frequency. The input circuits comprise, for this purpose, tuners.

That said, the input circuit ME1 could receive the second audio content and the input circuit ME2 could receive the first audio content.

As an indication, only two input circuits ME1 and ME2 are illustrated. Obviously, more input circuits for receiving more audio contents broadcast on different frequencies can be envisaged.

The receiver R can be tuned to a first frequency corresponding to a first audio content from a first radio station via the first input circuit ME1, while the second input circuit ME2 at the same time performs a scan of frequencies to search for an alternative frequency to the first frequency.

It should be noted that both of the input circuits (ME1 and ME2) are capable of performing a frequency scan.

The receiver R further comprises a processor MT configured to detect, from the at least one additional audio content, a second audio content broadcast on a second frequency, advantageously having a level of quality above a threshold, and paired with the first audio content.

Thus, the processor MT comprises a first detector DT1 suitable for performing a first detection, on a current frequency, of a current audio content having a level of quality above the threshold.

The first detector DT1 can use different criteria to assess the quality of the current audio content.

If the current audio content is broadcast in FM, a magnetic field intensity (or field strength) is, for example, assessed in dBμV by the first detector.

If the current audio content is broadcast in DAB, for example, a bit error rate (BER) of a fast information channel (FIC), FIC-BER, is for example assessed.

For both cases (FM and DAB), a quality index corresponding to three levels of quality: GOOD, AVERAGE and WEAK and having configurable thresholds for FM and DAB frequencies is for example used to provide an overall estimation of the quality.

By way of example, in the FM case, a magnetic field strength greater than 20 dBμV can be considered to be representative of a GOOD level of quality. The level of quality can be considered to be WEAK if the magnetic field strength is less than 4 dBμV. The level of quality is then considered to be AVERAGE for magnetic field strengths between 4 and 20 dBμV.

By way of example, for the DAB case, the level of quality is considered to be GOOD if the bit error rate BER of the fast information channel FIC is less than 1%. A BER rate between 1% and 5% is considered to be representative of an AVERAGE level of quality. If the BER rate is greater than 5%, the level of quality is considered to be WEAK.

The processor MT further comprises a second detector DT2 suitable to determine whether or not there is a pairing of the current audio content with the first audio content.

The second detector DT2 thus compares the current audio content with the first audio content by using audio pairing algorithms known to those skilled in the art.

A number of techniques involving audio pairing algorithms can be found in the literature.

These audio pairing algorithms are based generally on a Fourier transform to convert audio contents to be paired into the frequency domain then on correlation processing operations between the two audio contents. Generally, two audio contents can be considered to be paired for example when at least one correlation peak is detected.

Other techniques such as dynamic time warping (DTW) can be adopted for comparisons and temporal alignments of the audio contents.

Those skilled in the art will also be able to refer for information to the document "MATCH: A MUSIC ALIGNMENT TOOL CHEST" (S. Dixon, G. Widmer, *ISMIR* 2005) which describes an algorithm suitable for aligning and pairing audio streams, or else to the document "An industrial-strength audio search algorithm" (A. Wang, *ISMIR*, October, 2003) which describes a number of methods based on digital imprints proposed for audio pairings, or else refer to the document "Survey and evaluation of audio fingerprinting schemes for mobile query-by-example applications" (Vijay Chandrasekhar et al., *ISMIR*, pages 801-806, 2011) which discloses a summary of various audio pairing algorithms.

The processor MT also comprises a controller MC suitable for activating the input circuits ME1, ME2 to perform a frequency scan. The controller MC is also suitable for activating the first and second detection circuits.

The different functions DT1, DT2 and MC incorporated in the processor MT can be produced for example in the form of software in a microprocessor.

Figure 2:
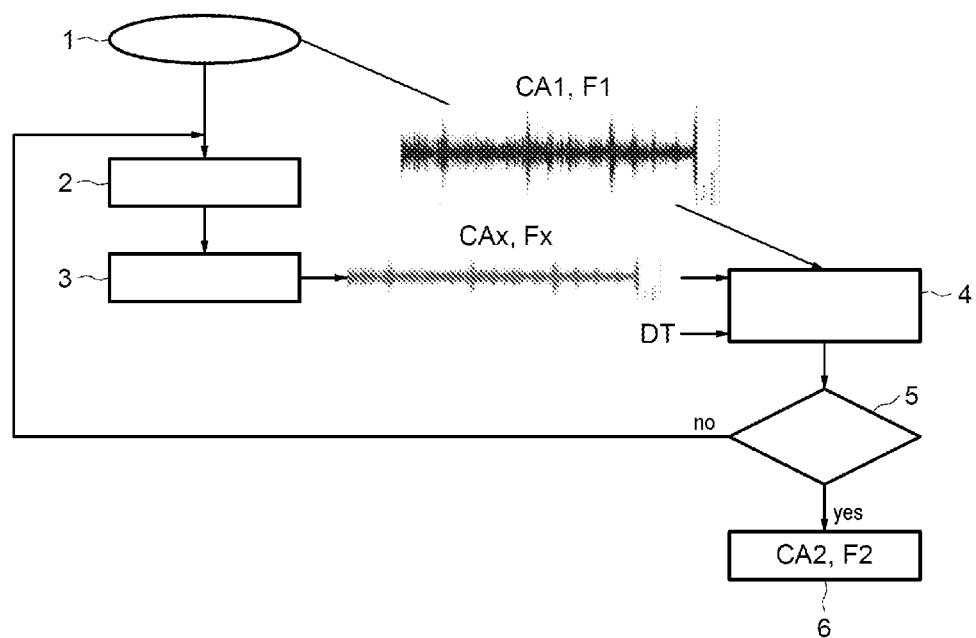
FIG. 2 schematically illustrates different steps of an exemplary method for managing a radio service continuity according to the invention.

Reference is now made to FIG. 2 to illustrate in detail an exemplary method for managing a radio service continuity based on synchronized broadcasts of identical audio contents on different frequencies using the receiver R which has just been described.

After the receiver R has been switched on, the first input circuit ME1 is first of all tuned to a first frequency F1 corresponding to a first broadcast of a first audio content CA1 (step numbered 1). This first audio content CA1 is delivered directly to the processor MT as the reference audio content for processing operations in the audio pairing step numbered 4.

The second input circuit ME2 then starts a frequency scan searching for an additional audio content broadcast on another frequency (step numbered 2).

In the step numbered 3, a detection is launched on a current frequency Fx of a current audio content CAx having a level of quality above a threshold.

Once the level of quality of the current audio content CAx is detected as being above a threshold (the level of quality is for example at least AVERAGE), the audio content CA1 is delivered to the audio pairing algorithm as candidate audio content.

Since audio contents from the same radio station broadcast on different frequencies in FM are temporally synchronized, it is possible to directly detect or not detect the pairing between these two audio contents CA1 and CA2, broadcast in FM, since they are temporally aligned.

In the case where one of the two audio contents CA1 or CAx is broadcast in FM analog mode and the other audio content CAx or CA1 is broadcast in DAB digital mode, it is advantageously possible to perform, prior to the possible detection of the pairing, a temporal alignment of the two audio contents CA1 and CAx by taking into account the time offset between the analog broadcast and the digital broadcast.

For this purpose, the time offset may have previously been estimated and stored in a database. As a variant, a conventional algorithm makes it possible to combine both the temporal realignment and the matching of radio content. It would also be advantageously possible to receive a DT signal containing information on the temporal delay between the two audio contents (CA1 and CAx) in the step numbered 4.

The pairing or not between the two audio contents CAx and CA1 is then detected (step numbered 5).

If the result of the audio pairing is positive, the processor MT, the current frequency Fx being studied can then be considered to be a second frequency F2 broadcasting a second audio content (identical to the first audio content) and the receiver is switched over to the frequency F2 to receive the second audio content (step numbered 6). The continuity of service is thus assured.

Otherwise, there is a return to the step numbered 2 to continue the frequency scan and repeat the steps numbered 2 to 5.

It should be noted that the management method which has just been described could also run in parallel with a detection of PI codes of an RDS system, which makes the receiver R suitable for implementing an even more robust radio service continuity.

It would then be possible to implement additional switchover criteria in the step numbered 5 and determine a switchover strategy that also takes into account the presence of the RDS system.

The method according to one implementation of the invention thus makes it possible to ensure a radio service continuity when RDS services are not available or in the case where levels of quality of the RDS signals are too weak to be detected.

What is claimed is:

1. A method for managing, in a receiver, a radio service continuity based on synchronized broadcasts of identical audio contents on different frequencies, the method comprising:
 tuning the receiver to a first frequency that corresponds to a first broadcast of a first audio content;
 scanning a plurality of frequencies;
 detecting in the receiver a second audio content broadcast on a second frequency, the second audio content broadcast having a level of quality above a threshold; and
 pairing the second audio content with the first audio content.

2. The method according to claim 1, further comprising switching the receiver over to the second frequency based on a selection criteria, so as to broadcast the second audio content and thus ensure the radio service continuity.

3. The method according to claim 1, wherein the detecting comprises:
 detecting a current audio content having the level of quality above the threshold, the current audio content being detected on a current frequency;
 determining whether or not there is a pairing of the current audio content with the first audio content;
 if the current audio content is paired with the first audio content, changing the current frequency to the second frequency; and
 if the current audio content is not paired with the first audio content, repeating the detecting and determining steps.

4. The method according to claim 3, wherein detecting whether or not there is a pairing comprises determining whether two audio contents are temporally aligned.

5. The method according to claim 4, wherein one of the two audio contents is broadcast in analog mode and the other of the two audio contents is broadcast in digital mode, and wherein determining whether the two audio contents are temporally aligned takes into account a time offset between the analog broadcast and the digital broadcast.

6. The method according to claim 1, further comprising detecting program identification codes of a radio data system.

7. The method according to claim 1, wherein the broadcast frequencies comprise frequencies chosen from FM, DAB, DRM and HD Radio frequencies.

8. A receiver comprising:
 a first input circuit configured to receive a first audio content broadcast on a first frequency;
 a second input circuit configured to perform a frequency scan and receive an additional audio content broadcast on another frequency; and
 a processor configured to detect, from the additional audio content, a second audio content broadcast on a second frequency having a level of quality above a threshold and being paired with the first audio content.

9. The receiver according to claim 8, wherein the receiver is suitable for implementing radio service continuity based on synchronized broadcasts of identical audio contents on different frequencies.

10. The receiver according to claim 9, wherein the processor is further configured to switch over the receiver to the second frequency based on selection criteria, so as to broadcast the second audio content and thus ensure the radio service continuity.

11. The receiver according to claim 8, wherein the the processor comprises a first detector suitable for performing a first detection on a current frequency of a current audio content having the level of quality above the threshold, a second detector suitable for performing a second detection of a pairing of the current audio content with the first audio content and a controller suitable for activating the input circuits so as to continue the frequency scan and operation of the first and second detectors, if a pairing is not detected.

12. The receiver according to claim 11, wherein the first detector, the second detector, and the controller are all implemented as software executed by the processor.

13. A receiver comprising:
 a first input circuit configured to receive a first audio content broadcast on a first frequency, wherein the first input circuit comprises a first tuner;
 a second input circuit configured to receive an additional audio content broadcast on another frequency, wherein the second input circuit comprises a second tuner; and a processor configured to detect, from the additional audio content, a second audio content broadcast on a second frequency having a level of quality above a threshold and being paired with the first audio content.

14. The receiver according to claim 8, wherein the broadcast frequencies comprise frequencies chosen from FM, DAB, DRM and HD Radio frequencies.

15. A receiver comprising:
a first tuner;
a second tuner; and
a microprocessor that is programmed to execute the steps of:
   causing the first tuner to tune to a first frequency that corresponds to a first broadcast of a first audio content;
   causing the second tuner to scan additional frequencies;
   detecting a second audio content broadcast on a second frequency, the second audio content broadcast having a level of quality above a threshold; and
   pairing the second audio content with the first audio content.

16. The receiver according to claim 15, wherein the microprocessor is further programmed to cause the receiver to switch over to the second frequency based on a selection criteria, so as to broadcast the second audio content.

17. The receiver according to claim 15, wherein the detecting comprises:
   scanning a plurality of frequencies;
   detecting a current audio content having the level of quality above the threshold, the current audio content being detected on a current frequency;
   determining whether or not there is a pairing of the current audio content with the first audio content;
   if the current audio content is paired with the first audio content, changing the current frequency to the second frequency; and
   if the current audio content is not paired with the first audio content, repeating the detecting and determining steps.

18. The receiver according to claim 17, wherein detecting whether or not there is a pairing comprises determining whether two audio contents are temporally aligned.

19. The receiver according to claim 18, wherein one of the two audio contents is broadcast in analog mode and the other of the two audio contents is broadcast in digital mode, and wherein determining whether the two audio contents are temporally aligned takes into account a time offset between the analog broadcast and the digital broadcast.

20. The receiver according to claim 15, wherein the broadcast frequencies comprise frequencies chosen from FM, DAB, DRM and HD Radio frequencies.

21. The receiver according to claim 15, wherein the receiver is suitable for implementing radio service continuity based on synchronized broadcasts of identical audio contents on different frequencies.

22. A method for managing a radio service continuity in a receiver, the method comprising:
   a) tuning the receiver to a first frequency that corresponds to a first broadcast of a first audio content;
   b) performing a frequency scan to search for an additional audio content broadcast on another frequency;
   c) detecting a current audio content having a level of quality above a threshold on a current frequency;
   d) delivering the current audio content to an audio pairing algorithm as a candidate audio content;
   e) determining whether or not the current audio content is paired with the candidate audio content;
   f) if the current audio content is paired with the candidate audio content, tuning the receiver to a frequency of the candidate audio content; and
   g) if the current audio content is not paired with the candidate audio content, repeating steps b), c), d) and e).

23. The method according to claim 22, further comprising detecting program identification codes of a radio data system.

24. The method according to claim 22, wherein determining whether or not the current audio content is paired with the candidate audio content comprises temporally aligning the first audio content with the candidate audio content.

25. The method according to claim 24, wherein the temporally aligning is based upon a time offset stored in a database.

* * * * *